United States Patent
Jeon

(10) Patent No.: US 10,122,185 B2
(45) Date of Patent: Nov. 6, 2018

(54) BATTERY MANAGEMENT SYSTEM

(71) Applicant: SAMSUNG SDI CO., LTD., Yongin-si, Gyeonggi-do (KR)

(72) Inventor: Ywun Seok Jeon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 130 days.

(21) Appl. No.: 15/188,077

(22) Filed: Jun. 21, 2016

(65) Prior Publication Data

US 2016/0380443 A1    Dec. 29, 2016

(30) Foreign Application Priority Data

Jun. 29, 2015 (KR) .................. 10-2015-0092167

(51) Int. Cl.
*H02J 7/00* (2006.01)

(52) U.S. Cl.
CPC .......... *H02J 7/0014* (2013.01); *H02J 7/0065* (2013.01)

(58) Field of Classification Search
CPC ............................ H02J 7/0014; H02J 7/0065
See application file for complete search history.

(56) References Cited

U.S. PATENT DOCUMENTS

| 8,860,252 | B2 | 10/2014 | Kang et al. |
| 2011/0296218 | A1 | 12/2011 | Kim et al. |
| 2011/0304299 | A1 | 12/2011 | Yang et al. |
| 2012/0175953 | A1* | 7/2012 | Ohkawa ............... B60L 3/0046 307/18 |

FOREIGN PATENT DOCUMENTS

| KR | 10-1074785 B1 | 10/2011 |
| KR | 10-1146378 B1 | 5/2012 |
| KR | 10-1193168 B1 | 10/2012 |

* cited by examiner

*Primary Examiner* — Vuthe Siek
(74) *Attorney, Agent, or Firm* — Lee & Morse, P.C.

(57) ABSTRACT

A battery management system includes a constant voltage DC/DC converter, an integrated circuit, and a regulator. The converter receives a first voltage from a plurality of battery cells and generates a first output voltage at a substantially constant level. The integrated circuit measures voltages of the cells and balances the cells. The regulator converts the first output voltage to a second output voltage. The first output voltage is supplied as a power supply voltage of the integrated circuit.

20 Claims, 5 Drawing Sheets

BATTERY MANAGEMENT SYSTEM

CROSS-REFERENCE TO RELATED APPLICATION

Korean Patent Application No. 10-2015-0092167, filed on Jun. 29, 2015, and entitled, "Battery Management System," is incorporated by reference herein in its entirety.

BACKGROUND

1. Field

One or more embodiments herein relate to a battery management system.

2. Description of the Related Art

A battery may have a plurality of cells connected in series. In order to reduce capacity deviation among the cells, a cell balancing operation may be performed. The cell balancing operation is usually performed based on voltages of the cells. Cell voltage measuring and cell balancing may be performed by an integrated circuit. The integrated circuit may operate based on power from the cells. However, the cells may not be able to supply sufficient power for operating the integrated circuit at all times, especially when the cell voltages are low.

SUMMARY

In accordance with one or more embodiments, a battery management system includes a constant voltage DC/DC converter to receive a first voltage from a plurality of cells and generate a first output voltage at a substantially constant level; an integrated circuit to measure cell voltages of the cells and balance the cells; and a regulator to convert the first output voltage to a second output voltage, wherein the first output voltage is to be supplied as a power supply voltage of the integrated circuit.

The system may include a processor to control the battery management system, wherein the second output voltage corresponds to an operational voltage of the regulator. The first voltage may be a highest voltage from among voltages of the cells connected to the integrated circuit. The integrated circuit may include an internal power circuit to generate voltages of one or more other levels for the integrated circuit.

The constant voltage DC/DC converter may be a buck-boost constant voltage DC/DC converter to receive the first voltage, the buck-boost constant voltage DC/DC converter to operate in at least a buck mode or a boost mode based on a comparison between a first voltage and the first output voltage. The system may include a first diode including an anode connected to receive the first voltage and a cathode connected to the integrated circuit; and a second diode including an anode connected to receive the first output voltage and a cathode connected to the integrated circuit, wherein the cathode of the first diode is connected to the cathode of the second diode.

When the first voltage is greater than the first output voltage, the first diode may be turned on and the integrated circuit is to receive the first voltage as a power supply voltage. When the first output voltage is greater than the first voltage, the second diode may be turned on and the integrated circuit is to receive the first output voltage as a power supply voltage.

When a number of channels of the integrated circuit is greater than a number of the cells connected to the integrated circuit, a voltage between the first output voltage and the first voltage may be supplied to at least one channel of a plurality of channels of the integrated circuit that is not connected to the cells.

The system may include a plurality of resistors connected in series between a first node coupled to the first voltage and a second node coupled to the first output voltage, wherein a connection node of two adjacent resistors of the plurality of resistors is connected to a corresponding one of the channels that are not connected to the cells.

When a number of channels of the integrated circuit is greater than a number of the cells connected to the integrated circuit, a voltage between the first output voltage and the first voltage may be supplied to at least one channel of a plurality of channels of the integrated circuit that is not connected to the cells.

The system may include a plurality of resistors connected in series between a first node coupled to the first voltage and a second node coupled to the first output voltage, wherein a connection node of two adjacent resistors from among the plurality of resistors may be connected to a corresponding one of channels that are not connected to the cells. The first output voltage may be greater than the second output voltage.

In accordance with one or more other embodiments, an apparatus includes a constant voltage DC/DC converter to convert a first voltage to a first output voltage, the first voltage derived from a battery and the first output voltage to be at a substantially constant level; and a regulator to convert the first output voltage to a second output voltage, wherein the first output voltage is to be supplied as a power supply voltage of an integrated circuit, the integrated circuit to measure cell voltages of cells of the battery and balance the cells. The first voltage may correspond to a voltage of one of the cells of the battery. The voltage of one of the cells of the battery may be a highest voltage of the cells of the battery. The second output voltage may power a processor to detect an abnormal condition of the battery.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
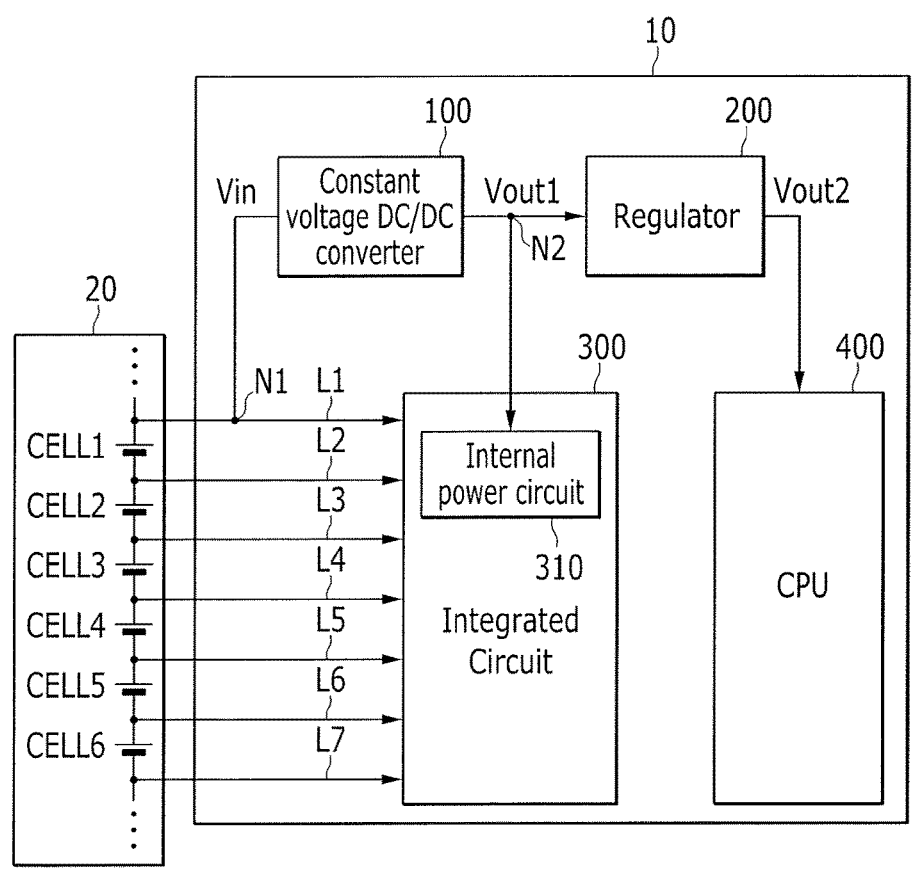
FIG. 1 illustrates an embodiment of a battery management system.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a battery management system 10 connected to a battery 20, which includes a plurality of cells connected in series. For illustrative purposes only, the battery is illustrated to include six cells CELL1 to CELL6. However, the battery may have a different number of cells in another embodiment.

The battery management system 10 includes a constant voltage DC/DC converter 100, a regulator 200, at least one integrated circuit 300, and processor which may be, for example, a central processing unit (CPU), controller, logic, or other processing circuit 400. The integrated circuit 300 performs cell voltage measuring and cell balancing on the cells CELL1 to CELL6. The battery management system 10 may further include another integrated circuit, for example, for performing cell voltage measuring and cell balancing on other cells, or the integrated circuit 300 may perform all of these operations. A power supply voltage may be supplied by the regulator 200.

The CPU 400 senses an abnormal state of the battery management system 10, stores and updates data for the battery management system 10, and transmits and receives information to and from a load or a charger connected to the battery 20. The CPU 400 may perform functions for controlling the battery management system 10.

An operational voltage of the integrated circuit 300 is determined with reference to the voltages of the cells connected to the integrated circuit 300. In one embodiment, the operational voltage may be greater than the level of the power supply voltage for the CPU 400 or another circuit.

The regulator 200 converts the level of a first output voltage Vout1 supplied by the constant voltage DC/DC converter 100 to a level appropriate for the CPU 400 or another circuit, in order to generate a second output voltage Vout2.

The integrated circuit 300 is connected to the cells CELL1 to CELL6 through wires L1 to L7 in order to measure cell voltages of CELL1 to CELL6 and to detect a cell to be balanced during a cell balancing operation. The integrated circuit 300 may use one or more predetermined parameters (e.g., an open circuit voltage (OCV), a state of charge (SOC) of cells, the OCV and the SOC, etc.) to detect the cell to be balanced.

For example, the integrated circuit 300 may use the measured cell voltage to produce the OCV, may use current flowing to the battery 20 to produce the SOC, and may discharge the cell or cells having a predetermined (e.g., relatively large) value from among corresponding cells. A cell balancing operation may be performed when OCV deviation, SOC deviation, or OCV deviation and SOC deviation among the cells is greater than a predetermined threshold. A variety of known methods may be used to determine the OCV and the SOC and to detect a cell to be cell-balanced.

The integrated circuit 300 includes an internal power circuit 310 which receives the first output voltage Vout1 of the constant voltage DC/DC converter 100, converts the first output voltage Vout1, and generates voltages with another level for the integrated circuit 300. In the present exemplary embodiment, the first output voltage Vout1 is a power supply voltage of the integrated circuit 300.

The constant voltage DC/DC converter 100 receives a voltage Vin of a node N1 to generate a first output voltage (Vout1) with a constant level. The voltage Vin of the node N1 may be the greatest voltage from among potentials of a plurality of cells connected to the integrated circuit 300. In another embodiment, the voltage Vin may be another voltage from among potentials of the cells connected to the integrated circuit. The voltage of the node N1 changes according to charged states of a plurality of cells (CELL1-CELL6), and the first output voltage (Vout1) with a constant level, is supplied to the integrated circuit 300 through the constant voltage DC/DC converter 100.

Figure 2:
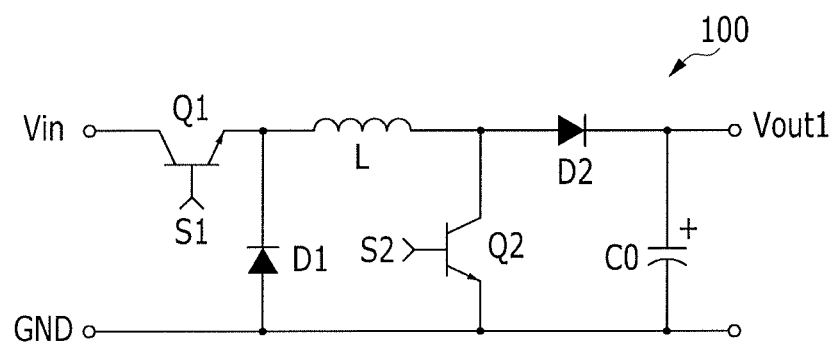
FIG. 2 illustrates an embodiment of a constant voltage DC/DC converter.

FIG. 2 illustrates an embodiment of the constant voltage DC/DC converter 100. In this embodiment, the constant voltage DC/DC converter 100 is a buck-boost constant voltage DC/DC converter. Converter 100 may be a different type of circuit in another embodiment.

Referring to FIG. 2, the constant voltage DC/DC converter 100 includes a first switch Q1, a second switch Q2, an inductor (L), a first diode D1, a second diode D2, and an output capacitor (CO). The first switch Q1 and the second switch Q2 are n-channel bipolar junction transistors (BJTs). A first switching signal S1 and a second switching signal S2 for controlling a switching operation are supplied to bases of the first switch Q1 and the second switch Q2.

A voltage (Vin) is input to a collector of the first switch Q1. The emitter of the first switch Q1 is connected to the cathode of the first diode D1 and a first terminal of the inductor (L). The collector of the second switch Q2 is connected to a second terminal of the inductor (L) and the anode of the second diode D2. The cathode of the second diode D2 is connected to a first electrode of an output capacitor (CO) and a first output voltage Vout1. The anode of the first diode D1, the emitter of the second switch Q2, and the second electrode of the output capacitor (CO) are grounded GND.

In operation, the constant voltage DC/DC converter 100 may operate in buck mode, boost mode, and a transition mode between the buck mode and the boost mode to generate the first output voltage Vout1 at a constant level. For example, when the voltage Vin is high (e.g., above a predetermined value), the constant voltage DC/DC converter 100 operates in buck mode to reduce the voltage Vin and to generate the first output voltage Vout1. For example, the first switch Q1 is turned on and the second switch Q2 is turned off to allow current to flow to the inductor (L) by the voltage (Vin) and to store energy in the inductor (L). In this instance, the second diode D2 is turned on.

The first switch Q1 is turned off and the first diode D1 is turned on. The current then freewheels through the first diode D1, the inductor L1, and the second diode D2. This operation may be periodically repeated. As a result, the first output voltage Vout1 may be controlled to have a constant level.

On the contrary, when the voltage Vin is low (e.g., below a predetermined value), the constant voltage DC/DC converter 100 operates in boost mode to increase the voltage Vin and generate the first output voltage Vout1. For example, while the first switch Q1 and the second switch Q2 are turned on, the current flows to the inductor (L) by the voltage Vin and energy is stored in the inductor (L). In this instance, the first diode D1 and the second diode D2 are not turned on. The second switch Q2 is turned on and the second diode D2 is turned on. The current then freewheels through the first switch Q1, the inductor (L), and the second diode D2

The above-noted operation is periodically repeated and the first output voltage (Vout1) is controlled to be at a constant level. In transistor mode, the buck mode is changed to the boost mode or the boost mode is changed to the buck mode.

Figure 3:
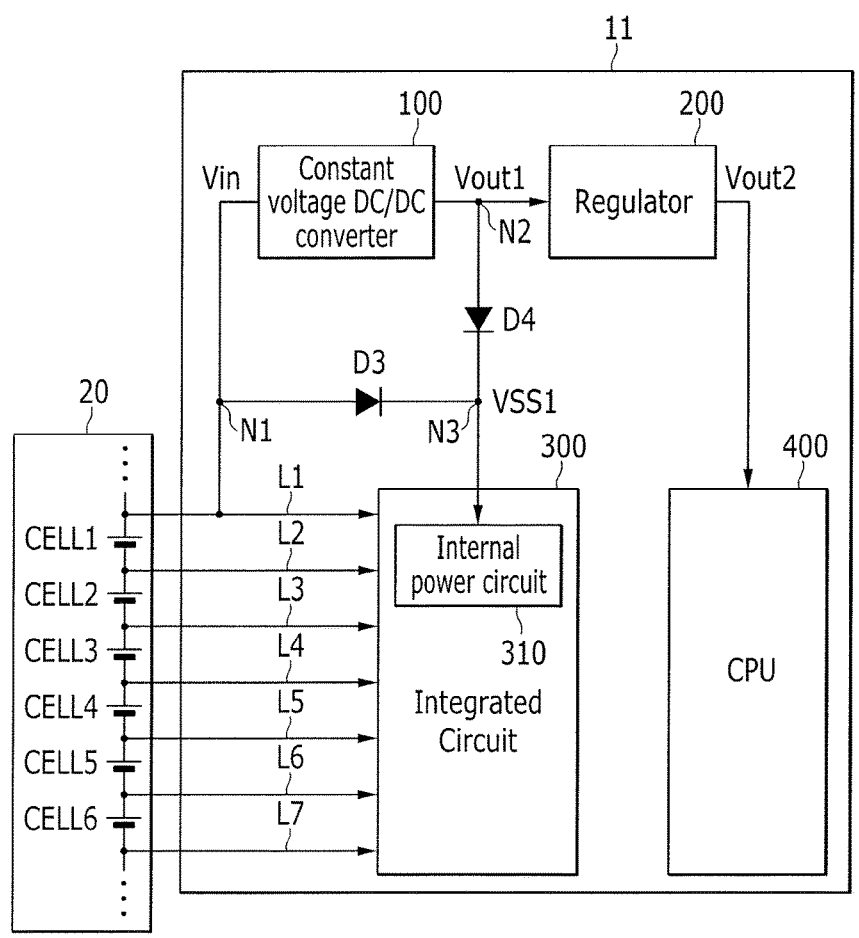
FIG. 3 illustrates another embodiment of a battery management system.

FIG. 3 illustrates another embodiment of a battery management system 11 designed to apply the greater of the voltage (Vin) or the first output voltage (Vout1) to the integrated circuit.

As shown in FIG. 3, the battery management system 11 includes a third diode D3 and a fourth diode D4. A voltage VSS1 of the node N3 connected to the cathode of the third diode D3 and the cathode of the fourth diode D4 is supplied as a power supply voltage to the integrated circuit 300. The anode of the third diode D3 is connected to the node N1, and the anode of the fourth diode D4 is connected to the node N2.

When the first output voltage Vout1 is greater than the voltage Vin of the node N1, the fourth diode D4 is turned on, the third diode D3 is not turned on, and a voltage VSS1 of the node N3 becomes the first output voltage Vout1.

When the voltage Vin of the node N1 is higher than the first output voltage Vout1, the third diode D3 is turned on, the fourth diode D4 is not turned on, and the voltage VSS1 of the node N3 becomes the voltage Vin. The constant voltage DC/DC converter 100 may control the first output voltage Vout1 to correspond to an entire cell voltage, that is, the voltage of the node N1.

Figure 4:
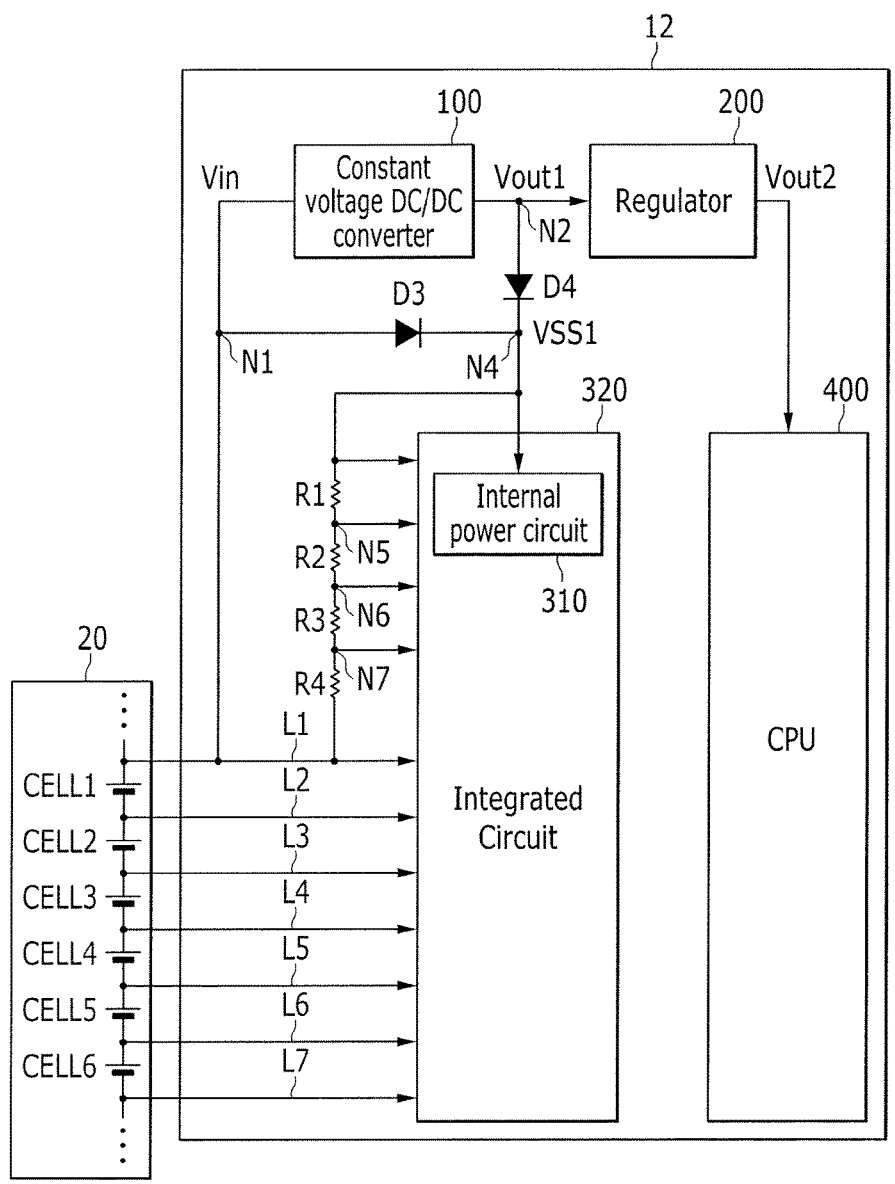
FIG. 4 illustrates another embodiment of a battery management system.

FIG. 4 illustrates another embodiment of a battery management system 12. In this embodiment, the number of connected cells may be less than the number of channels of the integrated circuit. In this instance, resistors for dividing a voltage difference between the first output voltage of the constant voltage DC/DC converter 100 and the voltage of the node N1 may be included.

In FIG. 4, the example is illustrated where the number of channels of the integrated circuit 320 is greater than the number of cells by four. Four resistors R1 to R4 are connected in series between a node N1 and a node N4. The node N4 is connected to one channel of the integrated circuit 320. A node N5, where the resistor R1 is connected to the resistor R2, is connected to another channel of the integrated circuit 320. A node N6, where the resistor R2 is connected to the resistor R3, is connected to the other channel of the integrated circuit 320. A node N7, where the resistor R3 is connected to the resistor R4, is connected to the other channel of the integrated circuit 320.

Voltages, generated by dividing the voltage Vin and the first output voltage Vout1 by one or more resistance(s), are supplied to the channels that are not connected to the cells CELL1 to CELL6, from among a plurality of channels of the integrated circuit 320. In this embodiment, the voltage between node N4 and CELL1 may be divided through a plurality of resistors R1 to R4 to prevent node N4 from being short-circuited with CELL1.

FIG. 4 illustrates that the resistors R1 to R4 are connected to the embodiment in FIG. 3. In another embodiment, the resistors R1 to R4 may be connected to the embodiment in FIG. 1.

Figure 5:
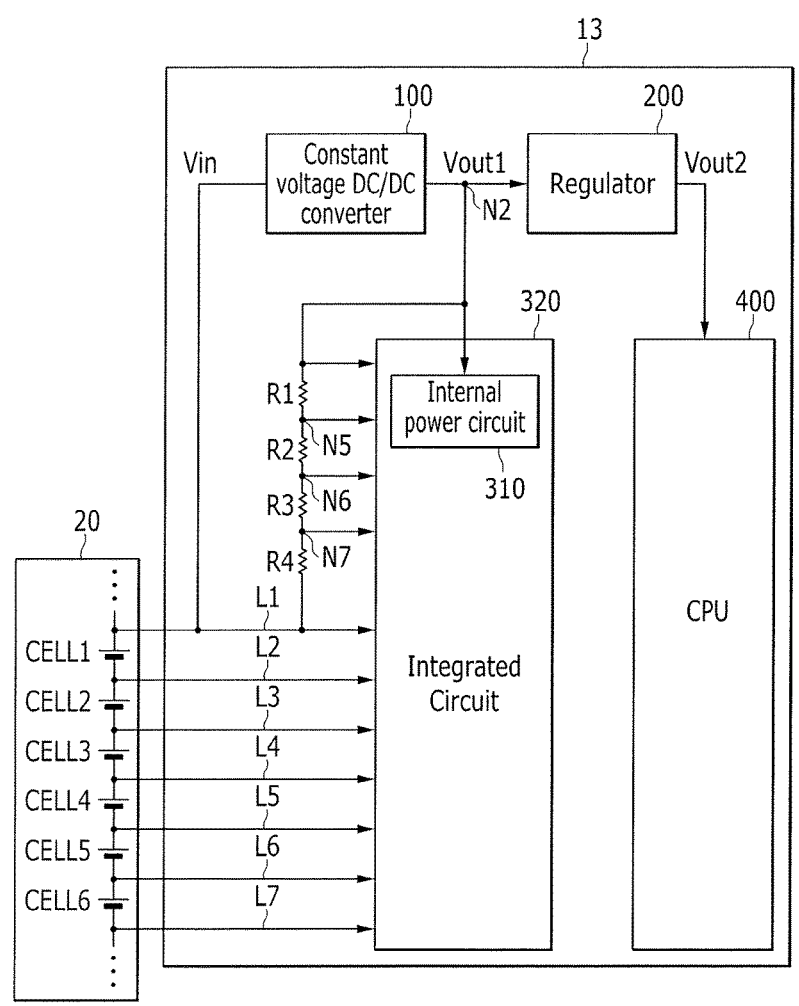
FIG. 5 illustrates another embodiment of a battery management system.

FIG. 5 illustrates another embodiment of a battery management system 13. In this embodiment, voltages generated by dividing the voltage Vin and the first output voltage Vout1 by one or more resistances are supplied to channels that are not connected to the cells CELL1 to CELL6, from among the channels of the integrated circuit 320.

The CPU, integrated circuit, or other processing features of the invention may be implemented, for example, in logic which, for example, may include hardware, software, or both. When implemented at least partially in hardware, the CPU, integrated circuit, or other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the CPU, integrated circuit, or other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery management system, comprising:
    a constant voltage DC/DC converter to receive a first voltage from a plurality of cells and generate a first output voltage at a substantially constant level, the constant voltage DC/DC converter to increase or decrease the first voltage based on a charged state of the plurality of cells to generate the first output voltage at the substantially constant level;
    an integrated circuit to measure cell voltages of the cells and balance the cells; and
    a regulator to convert the first output voltage to a second output voltage, wherein the first output voltage is to be supplied as a power supply voltage of the integrated circuit.

2. The system as claimed in claim 1, further comprising:
    a processor to control the battery management system, wherein the second output voltage corresponds to an operational voltage of the regulator.

3. The system as claimed in claim 1, wherein the first voltage is a highest voltage from among voltages of the cells connected to the integrated circuit.

4. The system as claimed in claim 1, wherein the integrated circuit includes an internal power circuit to generate voltages of one or more other levels for the integrated circuit.

5. The system as claimed in claim 1, wherein the constant voltage DC/DC converter is a buck-boost constant voltage DC/DC converter to receive the first voltage, the buck-boost constant voltage DC/DC converter to operate in at least a buck mode or a boost mode based on a comparison between a predetermined voltage and the first output voltage.

6. The system as claimed in claim 1, further comprising:
a first diode including an anode connected to receive the first voltage and a cathode connected to the integrated circuit; and
a second diode including an anode connected to receive the first output voltage and a cathode connected to the integrated circuit, wherein the cathode of the first diode is connected to the cathode of the second diode.

7. The system as claimed in claim 6, wherein:
when the first voltage is greater than the first output voltage, the first diode is to be turned on and the integrated circuit is to receive the first voltage as a power supply voltage.

8. The system as claimed in claim 6, wherein:
when the first output voltage is greater than the first voltage, the second diode is to be turned on and the integrated circuit is to receive the first output voltage as a power supply voltage.

9. The system as claimed in claim 6, wherein:
when a number of channels of the integrated circuit is greater than a number of the cells connected to the integrated circuit, a voltage between the first output voltage and the first voltage is to be supplied to at least one channel of a plurality of channels of the integrated circuit that is not connected to the cells.

10. The system as claimed in claim 9, further comprising:
a plurality of resistors connected in series between a first node coupled to the first voltage and a second node coupled to the first output voltage, wherein a connection node of two adjacent resistors of the plurality of resistors is connected to a corresponding one of the channels that are not connected to the cells.

11. The battery management system as claimed in claim 1, wherein the first output voltage is greater than the second output voltage.

12. A The battery management system, comprising:
a constant voltage DC/DC converter to receive a first voltage from a plurality of cells and generate a first output voltage at a substantially constant level;
an integrated circuit to measure cell voltages of the cells and balance the cells; and
a regulator to convert the first output voltage to a second output voltage, wherein the first output voltage is to be supplied as a power supply voltage of the integrated circuit and wherein: when a number of channels of the integrated circuit is greater than a number of the cells connected to the integrated circuit, a voltage between the first output voltage and the first voltage is to be supplied to at least one channel of a plurality of channels of the integrated circuit that is not connected to the cells.

13. The system as claimed in claim 12, further comprising:
a plurality of resistors connected in series between a first node coupled to the first voltage and a second node coupled to the first output voltage, wherein a connection node of two adjacent resistors from among the plurality of resistors is connected to a corresponding one of channels that are not connected to the cells.

14. An apparatus, comprising:
a constant voltage DC/DC converter to convert a first voltage to a first output voltage, the first voltage derived from a battery and the first output voltage to be at a substantially constant level, the constant voltage DC/DC converter to increase or decrease the first voltage based on a charged state of the battery to generate the first output voltage at the substantially constant level; and
a regulator to convert the first output voltage to a second output voltage, wherein the first output voltage is to be supplied as a power supply voltage of an integrated circuit, the integrated circuit to measure cell voltages of cells of the battery and balance the cells.

15. The apparatus as claimed in claim 14, wherein the first voltage corresponds to a voltage of one of the cells of the battery.

16. The apparatus as claimed in claim 15, wherein the voltage of one of the cells of the battery is a highest voltage of the cells of the battery.

17. The apparatus as claimed in claim 14, wherein the second output voltage is to power a processor to detect an abnormal condition of the battery.

18. The apparatus as claimed in claim 14, wherein the constant voltage DC/DC converter is a buck-boost constant voltage DC/DC converter to receive the first voltage, the buck-boost constant voltage DC/DC converter to operate in at least a buck mode or a boost mode based on a comparison between a predetermined voltage and the first output voltage.

19. The apparatus as claimed in claim 18, wherein the buck-boost constant voltage DC/DC converter is to operate in buck mode to reduce the input voltage when the first voltage is above the predetermined voltage and is to operate in boost mode to increase the input voltage when the first voltage is below the predetermined voltage.

20. The apparatus as claimed in claim 19, wherein the DC/DC converter is to operate in a transistor mode to change the buck mode to the boost mode or to change the boost mode to the buck mode.

* * * * *